United States Patent [19]

Coltrain et al.

[11] Patent Number: 5,019,607

[45] Date of Patent: May 28, 1991

[54] MODIFIED EPOXY RESINS AND COMPOSITES

[75] Inventors: Bradley K. Coltrain, Fairport; Gary A. Rakes; Victoria K. Smith, both of Rochester, all of N.Y.

[73] Assignee: Eastman Kodak Company, Rochester, N.Y.

[21] Appl. No.: 430,038

[22] Filed: Nov. 1, 1989

[51] Int. Cl.$^5$ ............... C08L 63/02; C08K 5/15; C08K 3/36

[52] U.S. Cl. ............... 523/435; 523/456; 523/466; 525/523; 528/27

[58] Field of Search ............... 525/523; 523/435, 456; 528/27

[56] References Cited

U.S. PATENT DOCUMENTS

| | | |
|---|---|---|
| 3,179,622 | 4/1965 | Haluska. |
| 3,324,055 | 6/1967 | Marks et al.. |
| 3,679,630 | 7/1972 | Corson. |
| 3,887,636 | 6/1975 | Julinao et al.. |
| 3,903,052 | 9/1975 | Wagner et al.. |
| 4,250,074 | 2/1981 | Foscante et al.. |
| 4,354,013 | 10/1982 | Kimura ............... 525/523 |
| 4,520,144 | 5/1985 | Noren et al. ............... 523/435 |
| 4,543,404 | 9/1985 | Sugano et al. ............... 528/26 |
| 4,604,443 | 8/1986 | Chang et al. ............... 528/28 |
| 4,632,970 | 12/1986 | Hiza et al. ............... 528/27 |
| 4,754,014 | 6/1988 | Ryntz et al. ............... 528/28 |
| 4,766,183 | 8/1988 | Rizk et al. ............... 525/454 |
| 4,786,667 | 11/1988 | Shimizu et al. ............... 525/523 |
| 4,972,029 | 11/1990 | Herzig et al. ............... 525/523 |

OTHER PUBLICATIONS

Baijol, M. D., Plastics Polymer Science and Technology, John Wiley & Sons, New York, NY (1982), pp. 628–638.

Clarson et al, Polym. Commun. 28 (1987) 249.

Stober et al, Journal of Colloid and Interface Science 26 (1968), pp. 62–69.

Mark et al, Polymer (1985), vol. 26, pp. 2069–2072.

Wilkes et, ACS Symposium Series (1987), 360, pp. 354–76.

*Primary Examiner*—Lewis T. Jacobs
*Attorney, Agent, or Firm*—Robert A. Linn

[57] ABSTRACT

Epoxy resins which have silicon-containing functional groups along the polymer backbone are prepared by reacting a polyether having non-terminal hydroxy groups with a modifying agent which (i) reacts with hydroxy groups and (ii) which also contains trialkoxysilane groups. The modified resins can be reacted with a silicon oxide precursor to form an organic/inorganic composite. The composites are shown to have improved properties at elevated temperatures.

12 Claims, 4 Drawing Sheets

MODIFIED EPOXY RESINS AND COMPOSITES

FIELD OF THE INVENTION

This invention relates to epoxy resins which have silicon-containing functional groups appended to the backbone of the polymer. This invention also relates to inorganic/organic composites made from the modified epoxy resins by using a sol-gel process. The composites, the compositions for preparing them, and the process for formation of the composites are three embodiments of this invention.

BACKGROUND OF THE INVENTION

A wide variety of materials is used to enhance physical properties of plastics by acting as fillers or reinforcements. Fillers may be active or inert. When inert, they are primarily extenders. However, with the addition of an active material or coating, inert fillers can become reinforcements.

The most widely used extender filler for plastics is calcium carbonate. This material has been coated with stearic acid and calcium stearate to improve rheological properties. Organic materials such as salts of alkylolamines and long chain polyaminoamides with high molecular weight acids have also been used as coatings.

Kaolin or clay is the second most commonly used extender pigment in plastics. Treating clays with silane, polyester, and metal hydroxide for surface modifications is known in the art.

Other silicates such as glass, asbestos, and wollastonite have been used as reinforcements. Among the silicas are sand, quartz, and diatomaceous earth. Quartz has been used with phenolic and epoxy resins for high performance, aerospace applications.

Silane coupling agents are used in various prior art, composite products. The hydrolysis product of the coupling agent provides a bond to the inorganic components, and maintains good adhesion to siliceous fillers and reinforcements, even under environmental attack.

The silane coupling agents have significant effects when used with a wide range of thermosetting and thermoplastic resins. For example, when unsaturated polyester with various mineral fillers is treated with silane coupling agent, the viscosity of the entire system is reduced and both dry and wet flexural strength are improved. The viscosity reductions are particularly significant for sheet molding compounds when polyester resins are filled with alumina trihydrate treated with silane coupling concentrates.

Epoxy- and amino-functional silane coupling agents provide a high level of reactivity with the matrix resin in filled epoxy resins. Although this system had relatively little effect on dry strengths, wet properties are improved more than 100% with the use of epoxy-functional silane, and improvement is also noted in electrical properties.

The present invention differs from the practices of the prior art described above. Applicants do not use a pre-formed filler or reinforcement such as calcium carbonate or a silicate like glass or clay. Instead, Applicants prepare an inorganic/organic composite in situ. Secondly, Applicants do not use silanes as surface coatings for pre-formed fillers or reinforcers. Instead, they use such materials as reactants to form linking groups and as precursors for an in situ-prepared silica network. The linking groups bond an organic polymer to the in situ prepared network. This approach produces materials with improved high temperature mechanical properties, particularly above the glass transition temperature (Tg) of the organic polymer.

RELATED ART

Baijol, M.D., *Plastics Polymer Science and Technology*, John Wiley and Sons, New York, N.Y. (1982), pages 628–638, discloses fillers, reinforcements, and coupling agents used in plastics technology.

U.S. Pat. No. 3,179,622 discloses polysiloxane isocyanates. A modified siloxane fluid with hydroxy groups is reacted with a diisocyanate and allowed to cure to obtain a rubber.

U.S. Pat. No. 3,324,055 discloses a composition comprising an organic reactive polymer, selected from a given list of various polymers, an inorganic polymer selected from a group including polysilicates, and a monomer capable of reacting with the organic and inorganic polymers. The monomeric substance polymerizes or interpolymerizes in situ to form a non-crazing, water impermeable, hard adhesive coating.

U.S. Pat. No. 3,679,630 discloses a curable composition comprising a polyepoxide, a polyisocyanatosilane, and a curing catalyst.

U.S. Pat. No. 3,887,636 discloses (block-amide-siloxane) (block-amide/imide) polymers crosslinked with an organodiisocyanate.

U.S. Pat. No. 3,903,052 discloses polyurethanes which have silyl-substituted biuret groups in side chains. The modified urethanes can be crosslinked by moisture.

U.S. Pat. No. 4,250,074 discloses polymeric matrices made by reacting an epoxy having at least two oxirane groups with an amine curing agent such as aminosilane.

U.S. Pat. No. 4,520,144 discloses a modified polyepoxide produced by reacting a diurethane diisocyanate with a polyepoxide having OH— groups. The diurethane diisocyanate is made from a dicarbinol-terminated polydimethyl siloxane with an excess of an organic diisocyanate.

U.S. Pat. No. 4,543,404 discloses compositions made from an epoxy alcohol, a hydroxyl-containing acrylate or methacrylate, an alkylpolyisocyanate, and an amino-containing alkoxysilane.

U.S. Pat. No. 4,604,443 discloses an ungelled partial hydrolysis product and a coating composition containing it. The partial hydrolysis product is prepared by reacting an organo-silicon containing material with a controlled amount of water.

U.S. Pat. No. 4,632,970 discloses an epoxy resin composition comprising an active organic curing agent and a urethane modified epoxy resin.

U.S. Pat. No. 4,754,014 discloses hydroxy functional polysiloxane graft copolymers containing 0–10 urethane linkages per molecule.

U.S. Pat. No. 4,766,183 discloses urethane/epoxy/silicone interpenetrating networks. The method of formation is summarized in the paragraph bridging Columns 1 and 2.

Clarson et al, *Polym. Commun.* 28 (1987) 249, discloses that a higher modulus and enhanced toughness can be obtained when reinforcing particles of silica are synthesized in situ in poly(methylphenyl siloxane) via the sol-gel process, conducted in the presence of ethylamine.

Stober et al, *Journal of Colloid and Interface Science* 26, 62–69 (1968) discloses a method of controlled growth of spherical silica particles using hydrolysis of alkylsilicates and ammonia as a morphological catalyst. Particle sizes range from less than 0.05 microns to 2 microns in diameter.

Mark et al, *Polymer* (1985) Vol. 26, 2069-72, teaches in situ preparation of silicate particles in poly(dimethylsiloxane). As in Clarson et al supra, the process entails swelling sheets of the polymer with tetraethylorthosilicate.

Wilkes et al, ACS Symposium Series (1987) 360, 354-76, teaches in situ preparation of silicate particles in triethoxysilane-endcapped poly(tetramethylene oxide).

The prior art discussed above does not disclose modified epoxy resins having a plurality of linking groups such as Thus, this invention pertains to a new class of modified epoxy resins. Furthermore, unlike the prior art, Applicants' invention does not comprise the modification of epoxides with silicones. Silicones have been added in the prior art to increase flexibility. In contrast, the composites of this invention exhibit stiffness and dimensional stability at high temperatures. Stated another way, composites of this invention have increased modulus values at such temperatures, and they are therefore useful in high performance applications at such temperatures.

Furthermore, the art teaches the use of trialkoxysilanes having amino functionality as curing agents or as coupling agents for pre-formed fillers and extenders. In Applicants' invention, such materials not only form modified epoxies, but also link the epoxies with silica rich regions that are formed in situ. For such reasons, the instant invention provides a significant advance in the art.

SUMMARY OF THE INVENTION

This invention relates to novel, substituted epoxy resins. These resins contain a plurality of urethane-containing side chains, or similar type(s) of side chains appended to the backbone of the resin. In a preferred embodiment, less than all of the hydroxy groups appended to the epoxy backbone in the starting material are reacted to prepare the side chains in the novel resins. During the course of Applicants' work, it was discovered that if all of the hydroxy groups were reacted, the product was not as satisfactory for making the composites of this invention, because the composite was more brittle than desired. Where brittleness is not a concern and high stiffness is desired and/or transparency is a desired property of a composite of this invention, one may react all of the hydroxy groups to form side chains.

This invention also relates to novel compositions which comprise a modified resin of this invention and a silicon oxide precursor. Such compositions, which are useful for preparing the composites of this invention, may also contain water and a sol-gel reaction catalyst such as an acid. The water and catalyst may be combined; for example, 0.15M hydrochloric acid supplies the acid catalyst plus water which is employed as a reactant.

This invention also relates to inorganic/organic composites, and to a method for their formation. These composites are made by a process which comprises conducting a sol-gel reaction in the presence of the modified epoxy resins of the invention. During the process, a silicon oxide network is obtained. Under the conditions of the process, modified epoxy resin present in the reaction mixture becomes bonded to the network that is formed.

It was surprisingly discovered that when water is used in the preparative process, the composite was not homogeneous, and that silicon rich zones and polymer rich zones appear in the composite product. This is indeed an unexpected result, since it could be inferred from the prior art that modifying polymers with reactive silicon moieties should increase the homogeneity of a composite.

It was also discovered that the silicon-rich zones can be surprisingly large, and remarkably regular in shape. More specifically, they can be nearly perfectly spheroidal. These discoveries relating to the size and shape of the silicon rich zones were not predictable from the prior art.

Applicants set out to find means for improving the properties of epoxy resins at elevated temperatures, viz., the stiffness of such resins as measured by dynamic and ultimate mechanical tests. They also set out to find an improved epoxy resin which did not rely upon reinforcements of the type known in the art; viz, preformed materials. They also sought means for providing chemical linkages between a substrate resin and a dispersed phase contained therein. During the course of their work, Applicants discovered that less than all of the hydroxy groups within the epoxy resins should be substituted to increase the strength. They also discovered that to enhance the properties of the inorganic/organic composite, it was highly beneficial to prepare the composite using water added to the reaction zone, rather than rely on atmospheric moisture.

Thus, this invention comprises the discovery that if little or no water is added to the reaction zone, the dispersed silica phase in the composites are small and random in shape, and that the product is transparent to visible light. On the other hand, this invention also comprises the discovery that if more water is added to the reaction zone, the composite product is opaque, and contains discrete silicon rich phases which are larger and remarkably spherical in shape. As mentioned earlier, this is unexpected, since it would be expected that the large number of silicon functionalities on the modified resins would retard, rather than promote phase separation. In light of these discoveries, it is believed that the present invention is a significant advance in the art.

The composites of this invention can be used in applications known for filled or reinforced epoxy resins. Thus, for example, the composites of this invention can be used as engineering plastics to produce electronic equipment parts and prepregs. The prepregs generally have the uses of many prepregs known in the art, and would be particularly useful in higher temperature applications.

Besides being useful as starting materials for forming the above-described composites, the modified epoxy resins of this invention can also be used as chemical intermediates for the formation of other resins. When used as intermediates, the reactive silicon-containing side chains and/or hydroxy groups along the chain can be reacted with other materials to produce new polymeric products. Alternatively, the epoxy groups (of the compositions of this invention which have such groups on the end of polymer chains) can be opened up by reaction with acids, bases, or nucleophiles, to prepare additional types of polymers useful as protecting films or coatings.

BRIEF DESCRIPTION OF THE DRAWINGS

FIG. 1 is a transmission electron micrograph (TEM), at a magnification of about 12,700X of a cross section of a composite of this invention. The light gray area is a polymer-rich zone. The darker, nearly round areas are silica-rich zones. These zones were prepared in situ during the composite-forming process of this invention. The striations which appear in the dark gray silica-rich areas are artifacts produced during preparation of the sample for photographing.

The micrograph clearly shows the remarkably spheroidal shape of the silicon-rich zones. It appears from the photograph that some distortion of the spheroidal shape may occur if two such zones form very near to one another. The size of the silica-rich zones in the photograph are from about 0.3 to 3.0 microns.

The bright spot in the upper left region of the photograph is an artifact. So are the pairs of lines that appear in the polymer-rich region. (A portion of a pair of these lines is near the aforementioned bright spot.)

The modified epoxy resin used in preparing the composite of the photograph was produced from Epon 1009 resin. That material is a copolymer of Bisphenol A and epichlorohydrin, and is a product of Shell Chemical Co. Applicants modified the starting material to prepare a modified polymer of this invention. The modification comprised substituting about 25% of the hydroxyl hydrogens with isocyanatopropyl-triethoxy-silane. The modified resin was reacted with 50 mole % tetramethoxysilane (TMOS) and 4.0 mole equivalents of water, added as 0.15M HCl, to prepare a composite of this invention.

A mixture of modified resin, tetramethoxysilane, and 0.15M HCl was stirred for one minute at 60° C., and then knife-coated on a polyethylene surface and cured for 15 hours at 200° C. to produce a film about 0.30 millimeters thick. The photomicrographed portion was obtained from the film. (Further details concerning the preparative procedures for preparing the modified resin and the composite film are set forth below.)

Comparison of the micrographs clearly illustrates the differences in structure between two classes of composite materials produced by this invention. As pointed out above, the addition of water to the reaction zone produces one type of product, while the substantial lack of added water in the reaction zone produces a transparent film, such as exemplified by FIG. 2. Both types of materials are products of this invention.

FIGS. 3 and 4 are designed to show enhanced mechanical properties which are provided by this invention. Both figures comprise a series of dynamic mechanical thermal analysis (DMTA) spectra. These spectra are plots of storage modulus (E') or stiffness of the composites, as a function of temperature. Generally a glassy polymer will have a modulus of about $10^{10}$ dynes/cm$^2$. As the polymer is heated through its glass transition temperature (Tg), the polymer becomes rubbery and loses stiffness or modulus. This results in a sharp drop in the DMTA curves. In the case of the composites shown here, the polymers are cross-linked via functionalized silicon groups and reinforced with inorganic networks formed from the in situ polymerization of silicon alkoxides. This results in a "rubbery plateau modulus" indicated by a plateau in the DMTA spectra at temperatures above Tg. The relative heights of the plateau moduli compare the mechanical properties of the composites at elevated temperatures.

In FIG. 3, Curve B represents a polymer made by endcapping Epon 1009 with 3-aminopropyltriethoxysilane. This polymer was allowed to cross-link via reaction with atmospheric moisture. The polymer of Curve A was identical to B except that water was added in the form of 0.15M HCl in order to speed the cross-linking reaction. From a comparison of the curves, it is obvious that virtually identical materials were formed whether water was deliberately added or merely allowed to be absorbed from the air. For both polymers, a Tg of approximately 120° C. was obtained, as well as a plateau modulus of about $10^8$ dynes/cm$^2$. Curve C represents a composite consisting of the same polymer as in Curves A and B, in addition to in situ polymerized tetramethoxysilane (TMOS). The TMOS was added at 50 mole %, and four moles of water, in the form of 0.15M HCl, per mole of Si have been added. It is obvious that the addition of the polymerized monomer has had little effect on the Tg, but the plateau modulus has been increased to about $10^9$ dynes/cm$^2$.

The interesting and unobvious aspects of FIG. 3 are Curves D and E which represent composites of this invention. Curve E represents an endcapped Epon 1009 resin equivalent to the polymer used to generate Curves A and B, but which had approximately one-half of the hydroxyl groups along the polymer chain functionalized with 3-isocyanatopropyltriethoxysilane. It was cross-linked using atmospheric moisture; no additional water was added to this composite. In the figure, no Tg is observed for this material, which indicates that the Tg has been shifted to temperatures above the upper limit of this experiment, or above 250° C. Additionally, Curve D represents the same functionalized resin of Curve E except that 50 mole % TMOS and four molar equivalents of 0.15M HCl were also added. Surprisingly, both Tg and plateau modulus have been lowered relative to the functionalized polymer of Curve E. This result is surprising since, based on the results shown with Curves A-C, the addition of TMOS would have been expected to have little effect on Tg, and would be expected to increase the modulus. It is also important to note that both of the composites of this invention represented in this figure (Curves D and E) have superior high temperature properties to other materials.

Equally surprising are the results in FIG. 4. Curve A is identical to Curve D in FIG. 3, i.e., functionalized Epon 1009, both endcapped and side chain functionalized, plus 50 mole % TMOS and four moles of 0.15M HCl. Curve B is an identical sample with the exception that no water has been added. The breaks in Curve B are experimental artifacts due to manually changing tension on the grips holding the sample, so that the final tension on that sample is substantially the same as for the other samples in FIGS. 3 and 4. Surprisingly, the addition of water is responsible for the lowering of Tg and the plateau modulus. The sample without the added water has superior high temperature properties. This would not be expected from the results of Curves A and B in FIG. 3. Additionally, one skilled in the art of polymerization of inorganic monomers would expect that the addition of acidic water would enhance the reaction rate of the TMOS monomer, and that this would aid the generation of an in situ inorganic network. Such a network would be expected to enhance mechanical properties.

The results in FIGS. 1-4 clearly show that the composites of the present invention have good high temperature properties and that water has a surprising effect on the type of composite which is produced. FIGS. 1 and 2 indicate that the addition of water promotes phase separation of silicon-rich domains. This is equally surprising since the addition of the numerous trialkoxysilane groups along the polymer chain would be expected to enhance homogeneity rather than promote phase separation.

Some data for the materials labeled A through E in FIG. 3 are as follows:

DESCRIPTION OF PREFERRED EMBODIMENTS

This invention relates to modified resins. In one embodiment, the resins are polyepoxides with urethane or similar linkages along the backbone of the polymer. In another embodiment, the resins have the same type of linkages along the polymer backbone and, in addition, they have derivatized epoxy groups at the polymer ends. Stated another way, in the second embodiment, the resins have urethane or similar linkages along the backbone, and they also have terminal groups prepared by reacting the epoxide linkages with an amino silane.

Thus in preferred embodiments, this invention comprises:

as a composition of matter, a polyether having the formula:

wherein T is the divalent group remaining after removal of the hydroxy groups from a dihydroxy compound, T being further characterized by being selected from the class consisting of (i) alkylene radicals having from two to about six carbon atoms, and (ii) arylene radicals remaining after removal of the hydroxy groups from a bisphenol having the formula:

wherein each $R^1$ is independently selected from hydrogen and alkyl radicals having up to about four carbon atoms, X is selected from halogen and alkyl radicals having from one to four carbon atoms, and "a" is a small whole number having a value from 0 to 4, E is an end group selected from (ii)

wherein R' is an alkylene group having up to about six carbon atoms and R'' is an alkyl group having up to about six carbon atoms, Q is selected from hydrogen and organic groups, such that from about 5 to about 95 mole percent of Q is an organic group and the remainder is hydrogen;

said organic group being selected from the class consisting of:

wherein R' and R'' have the same significance as above; and n is a whole number, such that the weight average molecular weight of said polyether is from about 500 to about 75,000.

Both types of polymers are prepared from polyethers which have hydroxy groups attached to non-terminal carbon atoms; i.e., they are attached to carbon atoms not at the ends of the polymer chains, but within the polymer chain. Polyepoxides of this type which are used as starting materials for this invention are known in the art and discussed below.

As an example, the polymers of this invention are prepared from polyepoxides made by reacting epichlorohydrin and Bisphenol A. Thus, in one embodiment the modified polymers of this invention are derived from polyethers composed essentially of recurring units having the formula wherein T is the divalent group remaining after removal of the terminal hydroxy groups from Bisphenol A.

When it is desired that the polymer has flexibility, T can be selected from aliphatic dihydroxy compounds. When it is desired that the polymer be more rigid, T can be selected from diphenols which have a high degree of aromaticity, e.g., Bisphenol A. Thus, it is to be understood that for this invention, the exact nature of T is an important, but not a critical variable.

Because of their availability, polyethers derived from Bisphenol A and epichlorohydrin are preferred starting materials for this invention. These polyepoxides have the formula:

As is well known in the art, when Bisphenol A is reacted with epichlorohydrin, the product generally has a low number average molecular weight. If higher molecular weight materials are desired, they can be prepared by fusing the diglycidyl ether of Bisphenol A (DGEBPA), Bisphenol A itself, and a catalyst that promotes chain propagation. Thus for example, one may use the method of Romanchiek et al, ACS Symp. Series 221, 85 (1985), in which purified DGEBPA is reacted with Bisphenol A using triphenyl phosphine as a catalyst. The higher weight epoxies prepared by such methods form preferred starting materials for this invention.

As mentioned above, the modified polyethers of this invention either have epoxy radicals as terminal groups, or terminal groups obtained by reacting the terminal epoxy groups with a compound having the formula:

$$H_2N-R-Si(R^a)_3 \quad (II)$$

In this formula,

R is a divalent organo group, and each $R^a$ is a hydrolyzable group. Of the organo groups represented by R, they can be aliphatic or aromatic in nature. Preferably, R is an alkylene group having from one to about eight carbon atoms. Highly preferred reactants have an R group which is solely composed of carbon and hydrogen, and which has from one to three carbon atoms.

The hydrolyzable groups represented by $R^a$ are selected from the hydrolyzable groups known in the art; confer, for example, U.S. Pat. No. 2,486,162, and U.S. Pat. No. 4,238,590. Of the hydrolyzable groups known in the art, alkoxy groups having up to about six carbon atoms, and halogens, e.g., chloro and bromo groups, are preferred. As shown by later portions of this specification, the hydrolyzable $R^a$ groups are removed in a process of this invention; hence, the exact nature of these groups is not critical. Therefore, it is preferred that the groups be relatively inexpensive and readily obtainable. Of these types of materials, it is preferred that the $R^a$ groups be selected from methoxy and ethoxy groups. Although not critical, it is preferred that each $R^a$ group be the same.

Highly preferred reactants for use in preparing the urethane linkages in the polyethers of this invention are isocyanatopropyltrimethoxysilane and isocyanatopropyltriethoxysilane.

Thus, two main types of modified resins of this invention can be made from polyethers which have the formula:

and from polyethers which have the formula:

The polymers of Formula IV can be made from the polymers of Formula III, by opening up the terminal epoxy groups with a reactant having Formula II, as discussed above. This process is illustrated by the following examples:

EXAMPLE 1

Epon 1010 (a Bisphenol A epoxide polymer from Shell Chemical Company with an epoxide functionality of 1.2-1.4 and an Mn of ca. 5,300 (20.0 g, and $7.5 \times 10^{-3}$ equivalents of epoxide groups based on 2.0 functionality) was dissolved in 100 ml of dioxane. 3-Aminopropyltriethoxysilane (APS) (2.2 g, $10 \times 10^{-3}$ mol, used in excess) was dissolved in 75 ml of dioxane and brought to reflux in a 500 ml 3-necked round bottomed flask. The Epon 1010 solution was added dropwise with an addition funnel. The solution was refluxed for 5 hours after the addition.

The resulting aminosilane-capped epoxy polymer could be used directly in the dioxane solution, or recovered by precipitation into hexane, or by stripping off the dioxane on a rotary evaporator.

EXAMPLE 2

A 3-L three-necked round bottom flask was charged with 20.7 g (0.094 mol) of 3-aminopropyltriethoxysilane (APS) and 300 ml (310 g) of dioxane and the mixture was brought to reflux. (A drying tube was placed over the condensor.) A solution of Epon 1009, 300 g (0.065 mol, ca. 0.10 equivalents based on 1.6 functionality) in 1 L (1,033 g) dioxane was added dropwide over a 1.5-hour period to the refluxing APS solution. The resulting solution was refluxed for 5 hours, cooled, and filtered to remove a small amount of insoluble material. This stock solution could be stored in a refrigerator (−20° C.).

It is to be understood that other polymers of this invention can be made from polymeric starting materials which are analogous to those depicted in Formulas III and IV. Thus, for example, polymers of this invention can be made from non-linear polymeric starting materials. They can also be made from starting materials in which some of the end groups are epoxy groups and other end groups are those depicted in Formula IV. Such polymers can be made in general in accordance with the procedure of the above examples by reacting less than all of the terminal epoxy groups. This can be accomplished by employing a molar excess of the resin which is to be modified.

The process of preparing polymers of Formula IV from Polymers of Formula III as illustrated by the above Examples is generally conducted at a temperature within the range of from about 83° C. to about 120° C. for from about 3 to about 10 hours. Higher and lower temperatures can be used. Ambient pressures are preferred, but elevated pressures can be used when it is desired to conduct the reaction above the normal boiling point of the components in the reaction mixture. The 1,4-dioxane used as a reaction solvent in the above examples can be replaced with tetrahydrofuran (THF), or other similar organic liquid which has appreciable solvent power for the reactants and is inert under the reaction conditions employed.

The 3-aminopropyltriethoxysilane (APS) used as a reactant in the preceding examples can be replaced with other similar compounds. Preferred reactants other than APS are 3-aminopropyltrimethoxysilane, and the 2-aminoethyl homologs of these compounds. One may also use N-(3-aminophenyl)-3-aminopropyltrimethoxysilane, and N-(2-aminoethyl)-3-aminopropyltrimethoxysilane, and the like.

The polymers having a structure depicted by Formula III or IV and prepared as illustrated by the above examples, are used as starting materials for preparing the modified polymers of this invention. To make the polymers of this invention, the polyethers of Formulas III and IV are reacted with one or more reactants which have the capability of reacting with the hydroxyl groups along the polymeric backbone. In addition to having a functionality capable of reacting with the hydroxy group, the reactants also have the structure —Si(R$^a$)$_3$ moiety wherein R$^a$ has the same significance as above. Generally, the reactant also has a group which links the group that is reactive with the hydroxy group and the —Si(R$^a$)$_3$ unit. The linking group can be any group (i) capable of linking the —Si(R$^a$)$_3$ unit and the hydroxy-reactive substituent, and which (ii) does not interfere with a purpose for which the polymer product is intended.

There are three preferred types of reagents for preparing the modified polymers of this invention. They are illustrated by the following formulas:

(V)

(VI)

(VII)

In Formulas V–VII, R' and R" have the same significance as above; and in Formula VII, the term "X" signifies a halogen such as chlorine, or bromine. Preferably, X is a chloro group. In general, chloro compounds are more readily available than bromo, iodo, or fluoro compounds, and their availability and generally lower cost makes them preferred reactants for use in this invention.

Of the three types of reactants represented by Formulas V–VII, the isocyanato compounds of Formula V are preferred. A preferred reactant of this type is isocyanatopropyltrimethoxysilane; another is isocyanatopropyltriethoxysilane.

As stated above, the polymers of this invention are prepared by reacting a polyether having hydroxy groups along the polymer chain with a reactant of the type illustrated by Formulas V–VII. When the process is conducted, it is preferred that less than all of the hydroxy groups be reacted. As stated above, Applicants discovered that when less than all of the hydroxy groups are converted, the composites made from the resultant polymers are less brittle. To avoid complete substitution, one may use any expedient known in the art. For example, one may use a quantity of a reactant of Formulas V–VII which is insufficient to react with all of the hydroxy groups present in the polyether. Alternatively, an operator can use a reaction time less than that required for full conversion. In general, one converts from about 5 to about 95 mole percent of the hydroxy groups in the polyether. Preferably, the amount of conversion is in the range of from about 25 to about 75 mole percent of the hydroxy groups.

To prepare a polymer of this invention, one adds the polymer to be used as a starting material to a suitable reaction vessel. The material charged may be in the form of a stock solution of the polymer such as that formed in the process illustrated by Example 2. If a stock solution is not employed, it is preferred to add sufficient solvent to act as a reaction medium for the process. Such a solvent may be 1,4-dioxane or tetrahydrofuran or similar substance. Solvents of choice are those which can dissolve the reactants, and which also are somewhat miscible with water. (Water miscibility can be advantageous when preparing an inorganic/organic composite as explained below). In general, one uses enough solvent to dissolve the reactants, provide sufficient fluidity to the reaction mixture, and also facilitate mixing with water, if water is to be used in a subsequent reaction step. There is no real upper limit on the amount of solvent to be used, this being governed by such secondary considerations as the size of the reaction vessel, economics, ease of recovery of the product from the reaction mixture, etc. Selection of the amount of solvent to be employed is within the skill of the art.

To the mixture of starting polymer and solvent is added the substance which is to react with the hydroxy groups along the backbone of the polymer and thereby form the polymer of this invention. In preferred embodiments, the reactant(s) to be employed are selected from compounds having Formula V, VI, or VII. The mode of addition of the reactant is within the skill of the art. If desired, one may add the reactant or reactants all at one time, or use a programmed addition. The operator may also add the reactant or reactants neat, or admixed with one or more other substances, such as a solvent or a catalyst. If a solvent is used, it is preferably the same substance that was charged to the reaction zone; however, it is not critical to use the same solvent, and other substances may be used.

Above it was mentioned that a catalyst may be added to the reaction zone. A catalyst is preferably employed when the starting polymer is to be reacted with an isocyanate such as depicted by Formula V, in order to prepare urethane linkages appended to the polymer backbone. For this purpose, an operator may add as a catalyst an organometallic compound selected from organo tin, organo lead, or organo mercury compounds, or a tertiary amine. Such urethane catalysts are known in the art. Tin compounds, such as dibutyltin dilaurate, are preferred urethane catalysts.

A catalytic amount of such substance is employed. In general, one uses an amount of urethane catalyst within the range of from about 0.2 to about 3 weight percent, based on the weight of isocyanate monomer. Catalytic amounts somewhat outside the range can be employed. In this regard, smaller amounts can be employed, provided that the amount of catalyst exerts a catalytic effect on the process. In general, one does not use much more than the minimum amount of catalyst required to obtain a catalytic effect. The excess amount usually serves no useful purpose and adds an unnecessary expense to the process.

To prepare a polymer of this invention, the reaction mixture comprising the starting polymer, the reactant of Formulas V-VII, the liquid reaction medium, and the catalyst (when employed) is heated to a suitable reaction temperature, i.e., a temperature which affords a reasonable rate of reaction, but which does not cause an undue amount of decomposition of a starting material and/or product. In general, the reaction temperature employed is within the range of from about 25° to about 100° C.; more preferably from about 50° to about 80° C.

The process is preferably conducted at ambient pressure; however, greater and lesser pressures can be employed, if desired. For example, one may use a superatmospheric pressure when it is desired to conduct the reaction at a temperature above the normal boiling point of the solvent employed. Thus, one may employ a pressure ranging from ambient up to about 100 atmospheres or higher, if desired.

The reaction time is not a truly independent variable, and it is dependent at least to some extent on the inherent reactivity of the reactants, the temperature employed, and similar reaction parameters. Generally, the reaction is complete in from about one minute to about six hours. The time of reaction can be determined experimentally by following the change in the IR spectra over the course of the reaction. For example, one may follow the disappearance of hydroxy groups or the appearance of a urethane linkage. Such a technique can be employed using an experimental amount of reactants, and the results obtained used for guidance when preparing a second, larger batch of materials. Alternatively, the course of the reaction can be determined, i.e., monitored by IR after scale-up, if desired.

In the following examples, illustrative polymers of this invention are prepared by the reaction of the epoxy polymer starting material with the isocyanatosilane. As shown, the polymer product of this invention is soluble, or substantially soluble in the reaction solvent.

The following examples illustrate that it is not necessary to remove the polymer from the reaction mixture prior to producing the composites of the invention. Using the polymer in the reaction mixture in which it is produced is a preferred operative expedient, since it avoids the time and cost associated with product work-up to isolate the polymer product. It is to be understood, however, that this invention is not limited to the use of the polymer in the reaction mixture. If desired, the product polymer can be isolated. For example, the product can be isolated by adding a liquid in which the product is insoluble, (such as) to the reaction mixture, and then removing the precipitated polymer from the liquid mixture. The precipitated polymer can be washed and further purified using procedures well known in the art.

Polymers of this invention are comparatively stable in the reaction mixture in which they are produced or dissolved in another inert solvent. The polymer can react slowly with atmospheric moisture to produce insoluble, condensed products. Hence, the polymer/solvent composition is kept in a closed vessel to protect it from atmospheric moisture, especially if the mixture is to be stored for an appreciable time.

The following examples not only illustrate the preparation of the polymers and the composites of this invention, but they also illustrate the compositions employed to prepare the composites. These compositions contain the polymer and a hydrolyzable silane. In a preferred embodiment, this invention provides a composition for preparing a composite of this invention, said composition comprising a mixture of (a) from 10 to about 75 mole percent of a compound having the formula $SiR^a{}_4$, wherein $R^a$ is a hydrolyzable group selected from halogen and alkoxy groups having from one to about six carbon atoms; and (b) from about 25 to about 90 mole percent of said modified epoxide, said composition additionally containing (c) an aqueous mineral acid such that the mineral acid content is sufficient to catalyze the hydrolysis of the X' groups, and the amount of water is equal to from about one to about four mole equivalents per mole of $SiX'_4$.

In the process of the following examples, the composites of this invention are produced in the form of thin films. For this purpose, the mixture from which the film was to be produced was coated onto a surface in a film forming amount. The surface employed was polyethylene. This substance was selected because the composite film of this invention could be readily removed from the polyethylene surface. It is to be understood, however, that this invention includes coatings of the composites on surfaces which adhere to the composite. Thus for example, the composites of this invention can be used as protective coatings or as adhesives.

To illustrate the production of films on non-adherent surfaces, the following procedure was used:

ISOCYANATE MODIFIED EPOXIDE PROCESSING

The solutions containing the polymer were degassed in a glass bell jar under house vacuum (23° C., 20 mm Hg) to remove excess air from the solutions prior to coating. The degassed solutions were then poured onto polyethylene sheets held flat on a coating block with vacuum (23° C., 20 mm Hg). The solutions were spread with a 0.080" gap knife to control the coating thickness. The coating block lid was closed, and the solutions were allowed to gel and dry for from 24 to 48 hours at 23° C. When dry, the coatings were removed from the coating block and placed in a vacuum oven (23° C., 760 mm Hg). With lower vacuum established (2 mm Hg), the oven temperature was raised to 50° C. and held at that temperature for two hours. The coatings were then removed from the oven, peeled from the polyethylene substrates, and tensile test specimens were cut on a die set. The test specimens were placed on Teflon sheets and again placed in the vacuum oven. Vacuum was established and the temperature was raised to 200° C. The samples were held at 200° C. under vacuum for 15 hours to effect a full cure. The finished sample thickness was 0.30 millimeters.

EXAMPLE 3

A 16.25 gram portion of the stock solution prepared in Example 2 was placed in a 50 mL round bottom flask. To the stock solution was added 3.15 ml of isocyanatopropyltriethoxysilane (this represents about one isocyanate linkage per —OH group along the polymer chain). Two drops of dibutyltin dilaurate catalyst was added and the solution stirred at 60° C. for 20 minutes. The resultant mixture was then knife coated on a polyethylene surface and cured according to the above procedure.

EXAMPLE 4

A 16.25 g stock solution prepared in Example 2 was reacted with 1.58 ml of isocyanatopropyltriethoxysilane and two drops of dibutyltindilaurate as described in Example 3. The resulting solution was reacted with 2.55 ml of tetraethoxysilane and 0.82 ml of 0.15M HCl. The reaction was conducted for five minutes at 60° C., and then the resulting mixture was knife coated and cured as described in the above procedure.

EXAMPLE 5

A stock solution was prepared by dissolving 150 g of EPON 1009 resin in 500 ml of tetrahydrofuran. (EPON 1009 is an epoxy resin produced by Shell Chemical Co. and has the following characteristics: $M_n \sim 4500$, epoxide functionality of 0.26–0.43 meq/g A 40 g portion of this stock solution was placed in a 100 ml round bottom flask. A 2.91 ml portion of 3-isocyanatopropyltriethoxysilane and two drops of dibutyltin dilaurate were added and the resultant solution stirred for 20 minutes at 60° C. using a water bath as a heat source.

The flask was removed from the bath and 5.24 ml of tetramethoxysilane was added with stirring. When the solution was homogeneous, 2.6 ml of 0.15M HCl (4.0 moles of water based on silicon) was added and the resulting solution stirred at 60° C. for five minutes. It was then knife coated as described above.

The following tables summarize properties of composites of this invention produced by the procedure of Examples 3–5, and other composites made by similar procedures.

In Table (I) the composites were made from epoxy resins that were modified by opening up of the terminal epoxy groups with 3-aminopropyltriethoxysilane in general accordance with the procedures of Examples 1 and 2. After modification of the terminal epoxy groups, the resin was reacted with 3-isocyanatopropyltriethoxysilane in general accordance with the procedures of Examples 3–5.

Referring now to Column (2) in the table, the entry "1X" indicates that the molar amount of 3-isocyanatopropyltriethoxysilane (ICTS) employed was approximately sufficient to react with all of the hydroxy groups in the modified epoxy resin. (The number of hydroxy groups was calculated from the resin molecular weight). Likewise, the entries "¼X" and "½X" signify that the amount of ICTS was approximately sufficient to react respectively with about 25% or 50% of the hydroxy groups along the polymer backbone.

Column (3) indicates the mole % of hydrolyzable, silicon oxide precursor employed to prepare a composite. Where no entry appears, no silicon oxide precursor was added. The entry "50 TMOS" signifies that one mole of tetramethoxysilane was used per each one mole portion of modified resin. The moles of modified polymers were based on the molecular weight of polymer repeat units (284 g/mol).

Column (4) signifies the mole equivalents of water that were added per mole of silicon oxide precursor. As shown, in some instances no water was added; in two instances four moles were added, and in one instance, two moles of water were added. The water was added as 0.15M HCl.

Columns (5)–(7) summarize properties of films of the materials that were formed as described above.

The Peak Stress and Young's Modulus were measured using Instron testing machines, models 1026 and TT-B. The model 1026 used the Instron Microcon II for data analysis and the TT-B was interfaced to an IBM-PC with the series IX Instron software. With regard to Column (5), the higher the number, the greater maximum load per cross-sectional area the material was able to sustain. Similarly in Column (6), the higher the number, the higher the initial slope of the stress-strain curve, indicating a stiffer material. The films labeled "clear" in Column (7) were transparent to the eye, while those labeled "white" were opaque and were white, as determined by visual inspection.

As can be seen, there is some deviation in the numeric values obtained upon measurement of materials prepared in substantially the same way. Nonetheless, from the data it is clear that the modulus is improved when a composite is made by adding a hydrolyzable silicon oxide precursor to the reaction mixture. Also, it appears from the data that the modulus is also improved by the addition of water to the reaction mixture.

TABLE 1

| | | Resins and Composites | | | | |
|---|---|---|---|---|---|---|
| (1) Product Identification | (2) Mole Portion Isocyanate Per Mole of Resin | (3) Mole % Silane | (4) Mole Equivalents of $H_2O$ | (5) Peak Stress (MPa) | (6) Young's Modulus (MPa) | (7) Clarity |
| (1) | 1 X | — | 0 | 40 | 2030 | clear |
| (2) | ½ X | — | 0 | 53 | 2200 | clear |
| (3) | ½ X | 50 TEOS | 4 | 54 | 2530 | clear |

TABLE 1-continued

| | Resins and Composites | | | | | |
|---|---|---|---|---|---|---|
| (1) Product Identification | (2) Mole Portion Isocyanate Per Mole of Resin | (3) Mole % Silane | (4) Mole Equivalents of $H_2O$ | (5) Peak Stress (MPa) | (6) Young's Modulus (MPa) | (7) Clarity |
| (4) | ¼ X | 50 TMOS | 4 | 57 | 2620 | clear |
| (5) | ¼ X | 50 TMOS | 0 | 55 | 2480 | clear |
| (6) | ¼ X | 50 TMOS | 0 | 64 | 2300 | clear |
| (7) | ¼ X | 50 TMOS | 2 | 64 (±10) | 1560 | white |

Table 2 is similar to Table 1. The materials described in Table 2 were made from EPON-1009 in which hydroxy groups were modified by the reaction with ICTS. In Columns (2)–(7), the entries have the same significance as above.

Comparison of Table 1 and Table 2 demonstrates that, in general, the peak stress is improved by not modifying the end epoxy groups. Thus, in general, materials of this invention which have terminal epoxy groups are stronger than those which do not.

Figure 1:
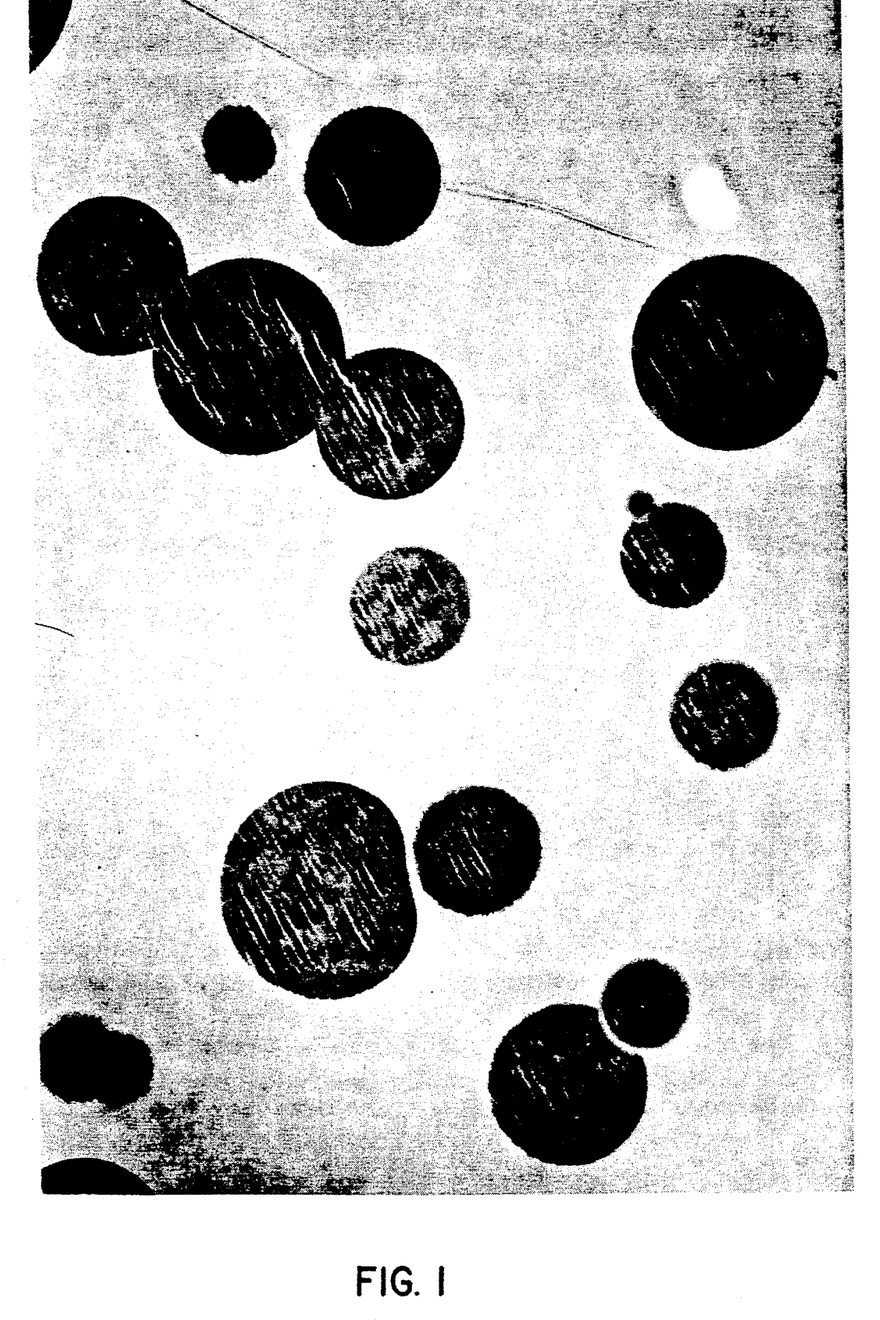
Figure 2:
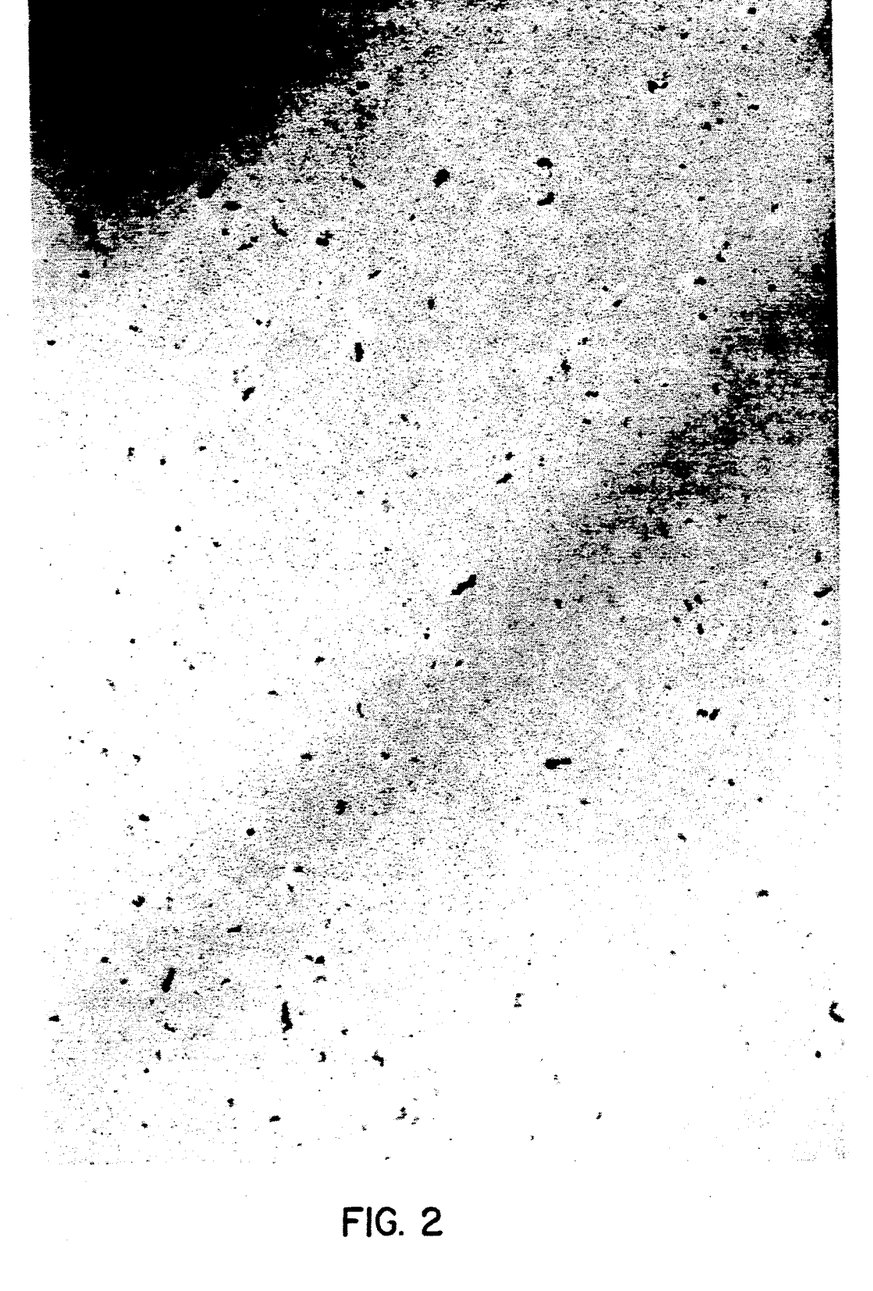
FIG. 2 is a transmission electron micrograph at a magnification of about 12,700X, of a composite of this invention which was prepared from the same ingredients in the same manner as the composite of FIG. 1, except that no water was added to the reaction zone. In contrast to the film photographed in FIG. 1, the film of FIG. 2 was clear, i.e., transparent, not opaque. The lighter gray area throughout the micrograph is a polymer-rich area, and the small, irregular darker areas are silicon-rich zones. It is noted that the darker areas are much less than a micron in size. More specifically, the photograph indicates that the size of the silicon-rich particles is in the range of from about 0.1 to about 0.3 microns. As can be seen, the larger particles in this range are elongated, slender particles which may be aggregates of smaller particles.

Sample 7 is depicted by FIG. 1; Sample 9 is depicted by FIG. 2.

The dynamic mechanical thermal analysis spectra were obtained on a Rheovibron DDV-II dynamic tensile tester (Toyo Measuring Instrucments, Ltd., Japan) automated by IMASS, Inc., Box 134, Hingham, Massachusetts 02018-0134. The data was obtained at a frequency of 11 Hz using a heating rate of 2.0° C./minute.

TABLE 2

| | Resins and Composites | | | | | |
|---|---|---|---|---|---|---|
| (1) Product Identification | (2) Mole Portion Isocyanate Per Mole of Resin | (3) Mole % Silane | (4) Mole Equivalents of $H_2O$ | (5) Peak Stress (MPa) | (6) Young's Modulus (MPa) | (7) Clarity |
| (1) | 1 X | 50 TEOS | 4 | 64 | 2250 | clear |
| (2) | ¼ X | 50 TMOS | 4 | 64 | 2500 | white |
| (3) | ¼ X | 50 TMOS | 2 | 59 | 2420 | white |
| (4) | ¼ X | 50 TEOS | 4 | 74 | 2240 | white |
| (5) | ¼ X | 50 TEOS | 4 | 70 | 1830 | white |
| (6) | ¼ X | 50 TMOS | 4 | 72 | 2530 | white |
| (7) | ¼ X | 50 TMOS | 4 | 76 | 2650 | white |
| (8) | ¼ X | 50 TMOS | 2 | 76 | 2530 | white |
| (9) | ¼ X | 50 TMOS | 0 | 69 | 2590 | clear |
| (10) | ¼ X | 50 TMOS | 0 | 70 | 2280 | clear |

Figure 3:
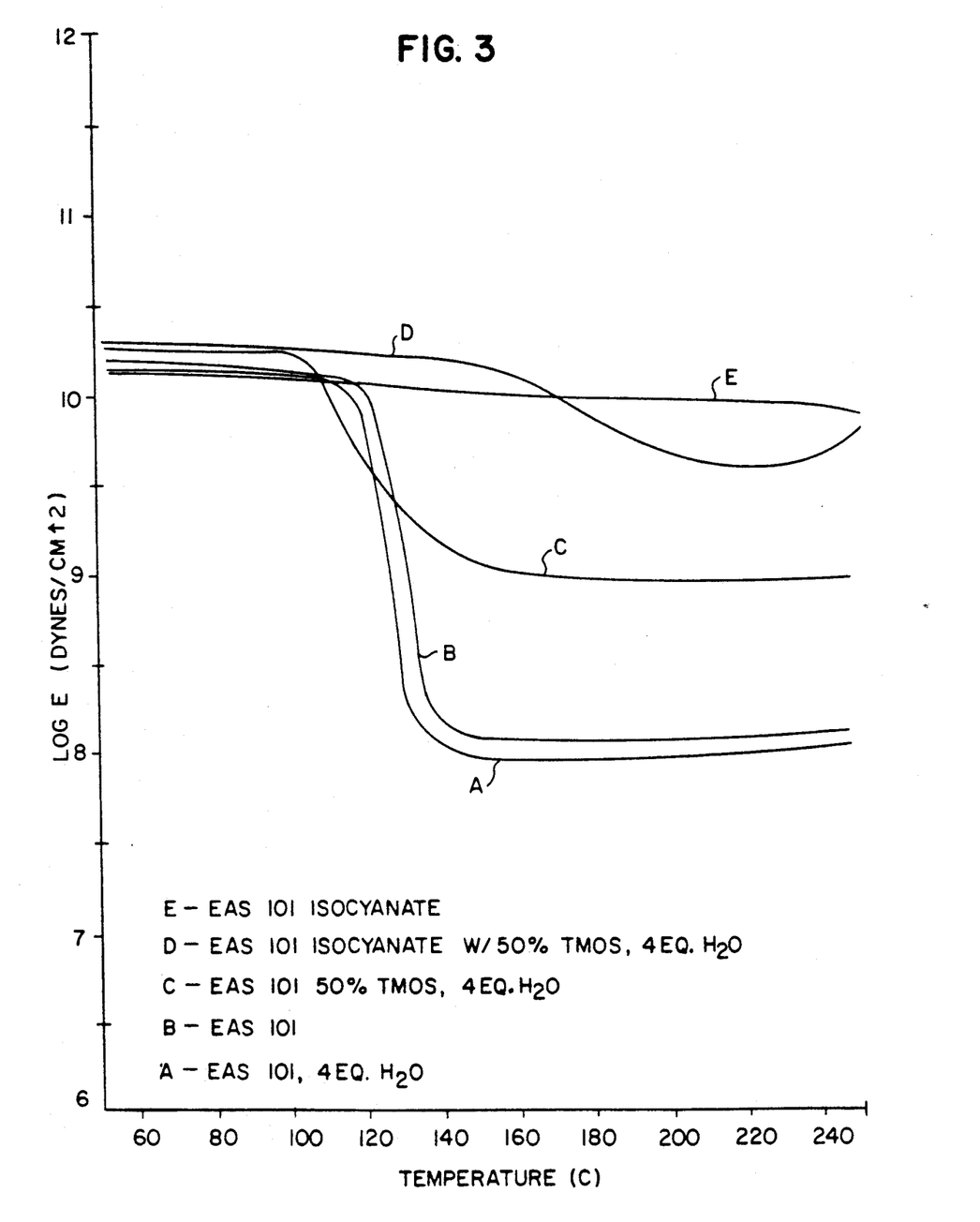

The following table gives the storage modulus at two temperatures for the products having properties depicted in FIG. 3.

TABLE 3

| | E' - Storage Modulus | | |
|---|---|---|---|
| | Sample | E' - (dynes/cm$^2$) | |
| Sample | (FIG. 3) | 75° C. | 200° C. |
| EAS 101, isocyanate | E | $1.24 \times 10^{10}$ | $8.37 \times 10^9$ |
| EAS 101, isocyanate w/50% TMOS, 0 eq. $H_2O$ | * | $1.45 \times 10^{10}$ | $7.90 \times 10^9$ |
| EAS 101, isocyanate w/50% TMOS, 4 eq. $H_2O$ | D | $1.61 \times 10^{10}$ | $3.65 \times 10^9$ |
| EAS 101, w/50% TMOS, 4 eq. $H_2O$ | C | $1.62 \times 10^{10}$ | $8.22 \times 10^8$ |
| EAS 101, 0 eq. $H_2O$ | B | $1.26 \times 10^{10}$ | $1.13 \times 10^8$ |
| EAS 101, 4 eq. $H_2O$ | A | $1.33 \times 10^{10}$ | $8.98 \times 10^7$ |

Figure 4:
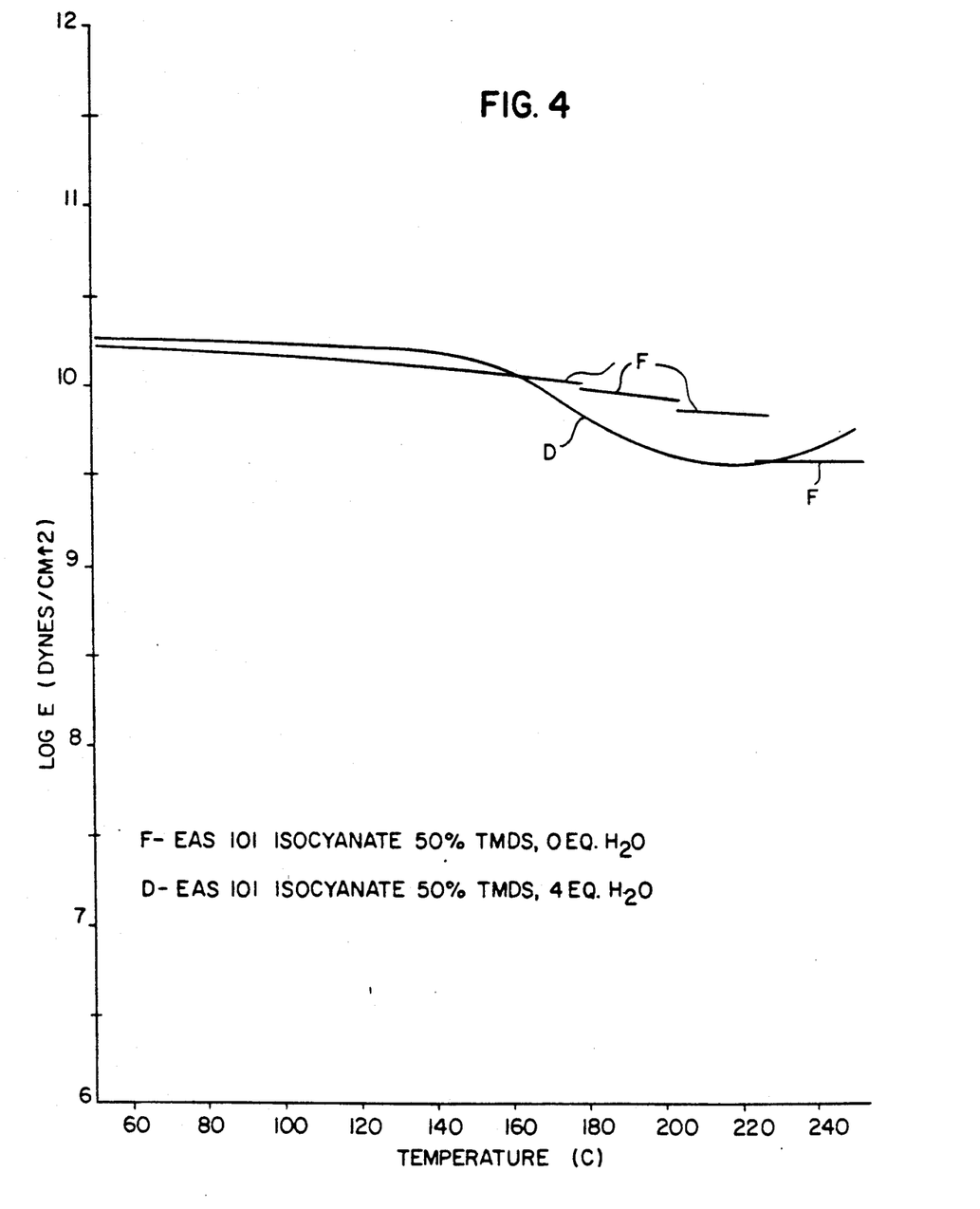

*Sample B, FIG. 4

The invention has been described above, with particular reference to preferred embodiments thereof. A skilled practitioner familiar with the above-detailed description can make many changes and substitutions without departing from the scope and spirit of the appended claims.

We claim:

1. A polyether having the formula:

wherein T is a divalent group selected from the class consisting of (i) alkylene radicals having from two to about six carbon atoms, and arylene radicals remaining after removal of the hydroxy groups from a bisphenol having the formula:

wherein each R is independently selected from hydrogen, and alkyl radicals having up to about four carbon atoms, X is selected from halogen and alkyl radicals having from one to four carbon atoms, and "a" is a small whole number having a value from 0 to 4, E is an end group selected from (ii)

(ii)

(iii)

wherein R' is an alkylene group having up to about six carbon atoms and R" is an alkyl group having up to about six carbon atoms, Q is selected from hydrogen and an organic group, such that from about 5 to about 95 mole percent of Q is an organic group and the remainder is hydrogen;

said organic group being selected from the class consisting of:

(v)

$-R'-Si(OR'')_3$, and (vi)

(vii)

wherein R' and R" have the same significance as above; and n is a whole number, such that the weight average molecular weight of said polyether is from about 500 to about 75,000.

2. A polyether according to claim 1 wherein E is

3. A polyether according to claim 2 wherein T is the arylene radical remaining after removal of the hydroxy groups from Bisphenol A.

4. A polyether according to claim 3 wherein said organic group has Formula (V).

5. A polyether according to claim 4 wherein said organic group is

6. A polyether according to claim 5 wherein R" is selected from ethyl and methyl.

7. A polyether according to claim 6 wherein from about 25 to about 75 mole % of the groups represented by Q are wherein R" is methyl or ethyl, and the remainder of said Q groups are hydrogen.

8. As a composition of matter, a composite of from about 10 to about 75 mole percent of sol-gel derived silicon oxide network, and from about 25 to about 90 mole percent of a modified polyepoxide, said modified polyepoxide being (i) derived from a reaction product of epichlorohydrin and Bisphenol A, and having a molecular weight of from about 500 to about 75000 and (ii) having from about 25 to about 75 mole percent of the hydroxy groups along the chain of said epoxide bonded to isocyanatoalkyl(trialkoxy)silane groups;

said composite having moieties of said modified polyepoxide bonded to said network by a plurality of linkages from said isocyanatoalkylsilane groups, such that said composite has silicon rich zones and modified polyepoxide rich zones, said silicon rich zones having a diameter within the range of from about 0.01 to about 10 microns.

9. A composition for preparing a composite of claim 8, said composition comprising a mixture of (a) from 10 to about 75 mole percent of a compound having the formula $SiX'_4$, wherein X' is a hydrolyzable group selected from halogen and alkoxy groups having from one to about six carbon atoms and (b) from about 25 to about 90 mole percent of said modified epoxide, said composition additionally containing (c) an aqueous mineral acid such that the mineral acid content is sufficient to catalyze the hydrolysis of the X' groups, and the amount of water is equal to from about one to about four mole equivalents per mole of $SiX_4$.

10. A composition of claim 9 additionally containing a water miscible solvent for said modified epoxide in sufficient quantity to solubilize said modified epoxide.

11. A composition of claim 10 wherein said solvent is 1,4-dioxane.

12. A process for preparing an organic/inorganic composite of claim 8, said process comprising (i) reacting (A) from about 10 to about 75 mole percent of a hydrolyzable silicon compound having the formula $SiX_4$, wherein X is selected from halogen and alkoxy groups having up to about six carbon atoms, with (B) about 25 to about 90 mole percent of a modified epoxide derived from epichlorohydrin and Bisphenol A and having (i) a molecular weight of from about 500 to about 75000 and (ii) from about 25 to about 75 mole percent of the hydroxy groups along said epoxide chain bonded to isocyanatoalkyl(trialkoxy)silane groups and (C) from about one to about four molar equivalents of water per mole of $SiX_4$ reactant; at a temperature of from about 25° C. to about 100° C., and (ii) thereafter curing the composition thereby produced at a temperature of from about 150° C. to about 250° C., whereby a composite is obtained having silicon rich zones and modified epoxide rich zones, said silicon rich zones having a diameter within the range of from about 0.01 to about 10 microns.

* * * * *